United States Patent
Nagata et al.

(10) Patent No.: US 9,633,320 B2
(45) Date of Patent: Apr. 25, 2017

(54) ENERGY DEMAND PREDICTION APPARATUS AND METHOD

(75) Inventors: Kazumi Nagata, Fuchu (JP); Kenji Baba, Kodaira (JP); Takaaki Enohara, Hino (JP); Yasuo Takagi, Chigasaki (JP); Nobutaka Nishimura, Koganei (JP); Shuhei Noda, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1054 days.

(21) Appl. No.: 13/361,641

(22) Filed: Jan. 30, 2012

(65) Prior Publication Data

US 2012/0239213 A1 Sep. 20, 2012

Related U.S. Application Data

(63) Continuation of application No. PCT/JP2011/078684, filed on Dec. 12, 2011.

(30) Foreign Application Priority Data

Mar. 15, 2011 (JP) .................. 2011-057137

(51) Int. Cl.
*G06Q 10/04* (2012.01)
*G06Q 50/06* (2012.01)

(52) U.S. Cl.
CPC ............ *G06Q 10/04* (2013.01); *G06Q 50/06* (2013.01)

(58) Field of Classification Search
CPC ..... G06Q 10/04; G06Q 50/06; Y02B 70/3225
USPC ....................................... 700/291
See application file for complete search history.

(56) References Cited

U.S. PATENT DOCUMENTS

| | | |
|---|---|---|
| 5,479,358 A | 12/1995 | Shimoda |
| 6,263,089 B1* | 7/2001 | Otsuka ............ G06T 7/60 382/107 |
| 2004/0133314 A1* | 7/2004 | Ehlers ............ F24F 11/0012 700/276 |
| 2004/0220702 A1 | 11/2004 | Matsubara |

(Continued)

FOREIGN PATENT DOCUMENTS

| | | |
|---|---|---|
| CN | 1414313 A | 4/2003 |
| CN | 1851338 A | 10/2006 |

(Continued)

OTHER PUBLICATIONS

Hallowell, Robert G. et al., Automated Extraction of Weather Variables from Camera Imagery, Proceddings of the 2005 Mid-Continent Transportation Research Symposium, Ames, Iowa, Aug. 2005.*

Extended European Search Report issued by the European Patent Office on Dec. 5, 2014, for European Patent Application No. 11810528.7.

Examination Report issued by the Hungarian Intellectual Property Office in Singapore Patent Application No. 201200702-7, mailed Aug. 17, 2012 (6 pages).

(Continued)

*Primary Examiner* — Christopher E Everett
(74) *Attorney, Agent, or Firm* — Finnegan, Henderson, Farabrow, Garrett & Dunner LLP (57) ABSTRACT

An energy demand prediction apparatus according to an embodiment includes an image analysis unit and a prediction unit. The image analysis unit generates analysis data including at least one of human information and environment information of a prediction target area based on image data acquired by an image sensor. The prediction unit generates prediction data by executing an energy demand prediction based on the analysis data and an energy demand prediction model generated using previous data corresponding to the analysis data.

10 Claims, 4 Drawing Sheets

(56) References Cited

U.S. PATENT DOCUMENTS

| | | | |
|---|---|---|---|
| 2005/0096797 A1 | 5/2005 | Matsubara et al. | |
| 2006/0276938 A1* | 12/2006 | Miller | 700/295 |
| 2008/0130958 A1 | 6/2008 | Ziomek | |
| 2008/0262820 A1 | 10/2008 | Nasle | |
| 2010/0222934 A1 | 9/2010 | Iino et al. | |
| 2011/0066299 A1* | 3/2011 | Gray | F24F 11/006 700/291 |
| 2011/0115910 A1* | 5/2011 | Brackney | 348/143 |
| 2011/0133655 A1* | 6/2011 | Recker | H02J 9/02 315/159 |
| 2012/0083930 A1* | 4/2012 | Ilic | G06Q 30/06 700/287 |
| 2012/0143356 A1* | 6/2012 | Berg-Sonne | G05B 15/02 700/49 |
| 2012/0155704 A1* | 6/2012 | Williams | G01W 1/00 382/103 |
| 2012/0158203 A1* | 6/2012 | Feldstein | G06F 1/3231 700/295 |

FOREIGN PATENT DOCUMENTS

| | | |
|---|---|---|
| CN | 1931679 A | 3/2007 |
| JP | 4-131600 | 5/1992 |
| JP | 6-180139 | 6/1994 |
| JP | 7-129659 | 5/1995 |
| JP | 08-240335 | 9/1996 |
| JP | 2000-333367 | 11/2000 |
| JP | 2003-316922 | 11/2003 |
| JP | 2004-280618 | 10/2004 |
| JP | 2005-122517 | 5/2005 |
| JP | 2005-158020 | 6/2005 |
| JP | 2006-350920 | 12/2006 |
| JP | 2007-199862 | 8/2007 |
| JP | 2008-086147 | 4/2008 |
| JP | 2008-295193 | 12/2008 |
| JP | 2009-240032 | 10/2009 |
| JP | 2010-159887 A | 7/2010 |

OTHER PUBLICATIONS

Search Report issued by the Hungarian Intellectual Property Office in Singapore Patent Application No. 201200702-7, mailed Aug. 17, 2012 (6 pages).

International Search Report issued by the Japanese Patent Offict in International Application No. PCT/JP2011/078684, mailed Mar. 13, 2012 (10 pages).

Masaaki Eda et al., "Sho Energy-ka o Mezashita Sensor Data Mining Shuho no Kento" (English title "Examination of Sensor Data Mining Technique for Aiming at Energy Saving"), Dai 2 Kai Forum on Data Engineering and Information Management—DEIM 2010—Ronbunshu, May 25, 2010 (6 pages).

International Preliminary Report on Patentability and Written Opinion issued by The International Bureau of WIPO on Sep. 26, 2013, for International Application No. PCT/JP2011/078684.

Notification Concerning Availability of the Publication (WO 2012/124225) of the corresponding International Application PCT/JP2011/078684 (3 pages), mailed from the International Bureau of WIPO on Sep. 20, 2012.

English Language International Search Report issued in the corresponding International Application PCT/JP2011/078684 (2 pages), mailed from the Japanese Patent Office on Mar. 13, 2012.

Notification of the First Office Action mailed Apr. 24, 2015 by the Chinese Patent Office in Application No. 2011800030919.

Final Office Action mailed Jan. 27, 2015 by the Japanese Patent Office in Application No. 2011-057137.

Notification of the Third Office Action mailed Dec. 11, 2015 by the State Intellectual Property Office of the People's Republic of China in Application No. 201180003091.9 (5 pages) and translation (9 pages).

Notification of the Second Office Action mailed Sep. 2, 2015 by the Chinese Patent Office in Application No. 201180003091.9 (8 pages) and translation (13 pages).

Decision of Rejection mailed May 4, 2016 by the State Intellectual Property Office of the People's Republic of China in Application No. 201180003091.9 (4 pages) and translation (9 pages).

Decision of Rejection mailed Aug. 5, 2016 by the European Patent Office in Application No. 11 810 528.7-1958 (7 pages).

\* cited by examiner

ENERGY DEMAND PREDICTION APPARATUS AND METHOD

CROSS REFERENCE TO RELATED APPLICATIONS

This application is a Continuation Application of PCT Application No. PCT/JP2011/078684, filed Dec. 12, 2011 and based upon and claiming the benefit of priority from prior Japanese Patent Application No. 2011-057137, filed Mar. 15, 2011, the entire contents of which are incorporated herein by reference.

BACKGROUND OF THE INVENTION

1. Field of the Invention

An embodiment of the present invention relate to an apparatus and method predicting an energy demand of various facilities.

2. Description of the Related Art

In recent years, prevention of global warming and reduction of environmental loads have received attention. For example, it is required to make use of capabilities of apparatuses for energy saving, creation, and storage equipped in facility such as a building, factory, and plant, so as to attain unwasted and efficient energy management.

In order to attain energy management such as demand control, an accurate energy demand prediction is required.

As an example of the energy demand prediction, a method of executing the energy demand prediction based on information including electric power usages, weather, temperature, schedule (business day, no-business day, or singularity), and the like is available.

This conventional energy demand prediction uses, for example, measurement values of physical sensors such as a thermometer, hygrometer, illuminometer, and electric power data.

However, when the energy demand prediction is executed using only the measurement values of the physical sensors, the accuracy does not often suffice.

BRIEF SUMMARY OF THE INVENTION

Technical Problem

The embodiment of the present invention have as an object to provide an energy demand prediction apparatus and method, which improve an accuracy of an energy demand prediction.

Solution to Problem

In an embodiment, an energy demand prediction apparatus includes an image analysis unit and a prediction unit. The image analysis unit generates analysis data including at least one of human information and environment information of a prediction target area based on image data acquired by an image sensor. The prediction unit generates prediction data by executing an energy demand prediction based on the analysis data and an energy demand prediction model generated using previous data corresponding to the analysis data.

DETAILED DESCRIPTION OF THE INVENTION

Embodiments of the present invention will be described hereinafter with reference to the drawings. Note that the same reference numerals denote the same or nearly the same components throughout the accompanying drawings, a description thereof will not be given or a brief description thereof will be given, and only differences will be described in detail.

First Embodiment

This embodiment will explain an energy demand prediction apparatus, which analyzes image data acquired by an image sensor to generate image analysis data including at least one of human information and environment information, which dynamically change in an energy demand prediction area, and executes an energy demand prediction based on the image analysis data. Furthermore, in this embodiment, the energy demand prediction may be executed further using, for example, information such as a temperature, humidity, weather, schedule, electric power usages and the like in addition to the image analysis data.

The energy demand prediction apparatus according to this embodiment accurately measures, for example, data such as environment information, electric energy, and human activity information in an energy demand prediction area by analyzing the image data, thus attaining an accurate energy demand prediction.

Figure 1:
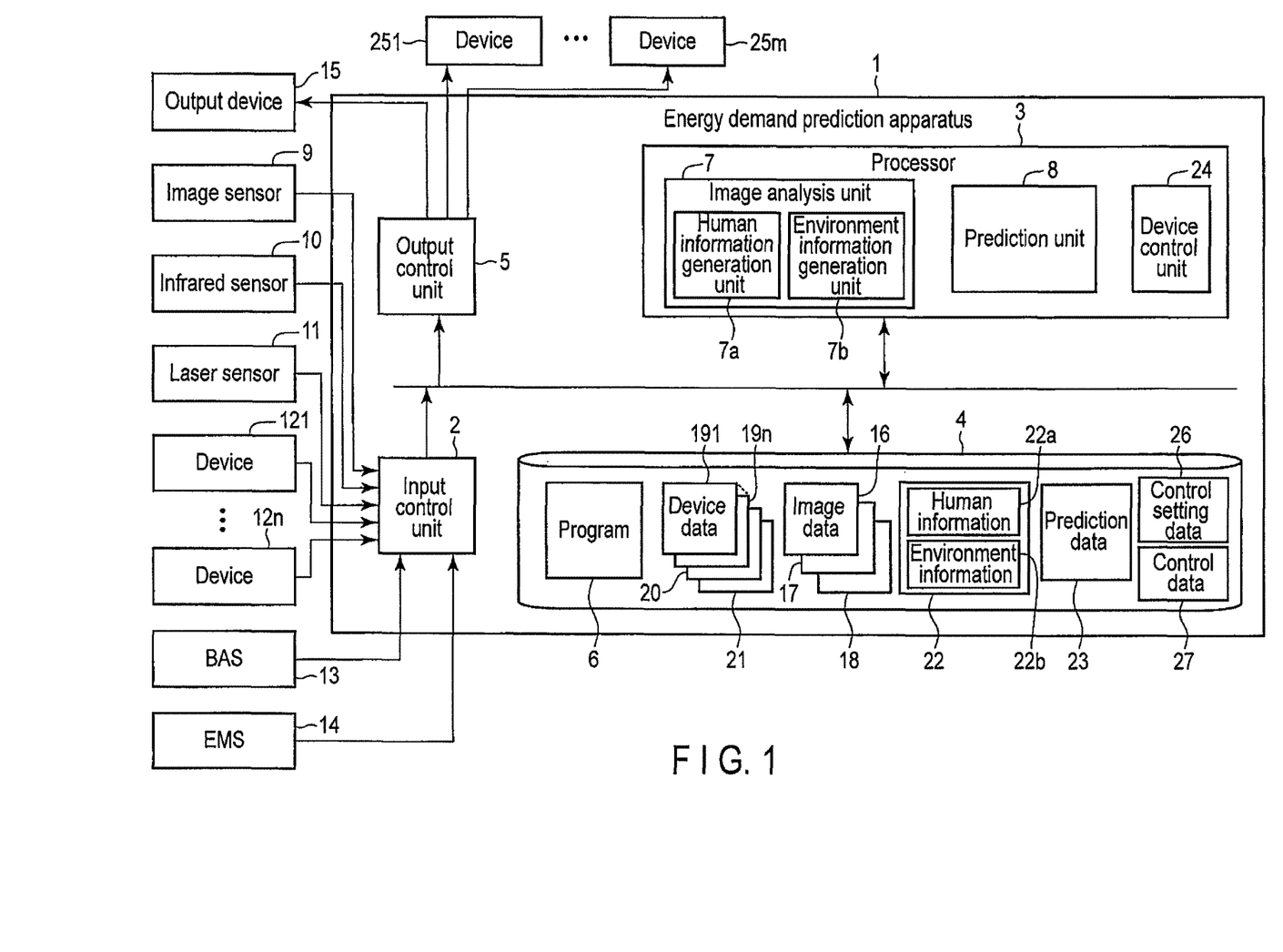
FIG. 1 is a block diagram showing an example of an arrangement of an energy demand prediction apparatus according to a first embodiment.

FIG. 1 is a block diagram showing an example of an arrangement of the energy demand prediction apparatus according to this embodiment.

An energy demand prediction apparatus 1 includes an input control unit 2, processor 3, storage device 4, and output control unit 5.

The processor 3 functions as an image analysis unit 7, prediction unit 8, and device control unit 24 by executing a program 6 stored in the storage device 4. Note that the image analysis unit 7, prediction unit 8, and device control unit 24 may be implemented by hardware in the energy demand prediction apparatus 1.

The energy demand prediction apparatus 1 is connected to an image sensor 9, infrared sensor 10, laser sensor 11, measurement devices 121 to 12n, building automation system (BAS: building monitoring system) 13, and environment management system (EMS) 14 to be able to receive various data associated with an energy demand prediction area. Furthermore, the energy demand prediction apparatus 1 is connected to an output device 15 and control target devices 251 to 25m.

The image sensor 9 includes, for example, a camera, image capturing device, visible camera, or the like.

The infrared sensor 10 includes, for example, an infrared camera or the like.

The laser sensor 11 measures a laser beam. The laser sensor 11 includes, for example, a laser camera.

The devices 121 to 12n include, for example, physical sensors such as a thermometer, hygrometer, illuminometer, and electric power meter, and other devices. The devices 121 to 12n acquire a temperature, humidity, illuminance, electric power information, weather information, schedule information, and the like.

The BAS 13 controls, monitors, and manages air-conditioning, heat sources, illuminations, reception and transformation of electric energy, disaster prevention, security, and the like in a building.

The EMS 14 manages an environment of the energy demand prediction area.

The devices 251 to 25m include devices as control targets such as air-conditioner, lighting devices, blind driving devices, curtain driving devices, and the like, which are installed within the energy demand prediction area.

The input control unit 2 controls the storage device 4 to store image data 16, infrared image data (infrared measurement data) 17, and laser image data (laser measurement data) 18, which are respectively acquired by the image sensor 9, infrared sensor 10, and laser sensor 11.

Also, the input control unit 2 controls the storage device 4 to store device data 191 to 19n acquired by the devices 121 to 12n.

Furthermore, the input control unit 2 inputs BAS data 20 of the BAS 13 and EMS data 21 of the EMS 14, and controls the storage device 4 to store these data.

The image analysis unit 7 executes analysis processing for the image data 16, infrared image data 17, and laser image data 18 stored in the storage device 4, generates analysis data 22 including human information 22a and environment information 22b, and stores the analysis data 22 in the storage device 4. The image analysis unit 7 implements functions as a human information generation unit 7a and environment information generation unit 7b.

The human information generation unit 7a extracts feature amounts from the image data 16, infrared image data 17, and laser image data 18, and executes recognition processing and the like based on the extracted feature amounts and set criteria, thereby generating the human information 22a.

The human information 22a includes the presence/absence of a person, the number of persons, a distribution/density of the persons, an amount of activity of the person, an amount of clothing of the person, a personal attribute (name, gender, body type, body height, age, etc.), a position of the person (standing position, seated position, etc.), and an activity state (during office work, transfer, conversation, and so forth) of a person in the energy demand prediction area, personal specific information of a person who is in the energy demand prediction area, and the like.

The environment information generation unit 7b extracts a feature amount from the image data 16, infrared image data 17, and laser image data 18, and executes recognition processing and the like based on the extracted feature amount and set criteria, thus generating the environment information 22b.

The environment information 22b includes light information such as an illuminance, amount of solar radiation, a blind opening/closing amount, incident state of sunlight, and the like, layout information such as the presence/absence, location, and number of office devices, the location and number of doorway and a window of an office, and a location of a path, the locations and numbers of heat sources and power consuming devices, weather information, and the like.

The prediction unit 8 executes the energy demand prediction based on the analysis data 22, the device data 191 to 19n, the BAS data 20, the EMS data 21, and an energy demand prediction model (prediction formula) stored in the storage device 4, and generates prediction data 23. Then, the prediction unit 8 stores the prediction data 23 in the storage device 4. In this way, using the analysis data 22 which changes dynamically in the energy demand prediction, a flexible and accurate prediction can be attained.

The energy demand prediction model is generated based on previous data including previous analysis data 22, previous device data 191 to 19n, previous BAS data 20, and previous EMS data 21, and a previous energy consumption amount corresponding to this previous data. Using the energy demand prediction model, a future energy (electric power) demand prediction can be executed.

The device control unit 24 executes control processing for the control target devices 251 to 25m associated with the energy demand prediction area based on the prediction data 23, the human information 22a and environment information 22b in the analysis data 22, the device data 191 to 19n, and control setting data 26 stored in the storage device 4, and generates control data 27 including at least one of control instructions and control values for the devices 251 to 25m. Then, the device control unit 24 stores the control data 27 in the storage device 4.

In this case, the control setting data 26 includes individual user information, individual attribute data, and individual comfort state information of persons. Also, the control setting data 26 includes control values corresponding to human action states (an action sensitive to heat, that sensitive to the cold, during a desk work, during stand talking, during walking).

For example, the device control unit 24 generates the control data 27 based on the prediction data 23, so that an energy demand fall within a predetermined value range. Thus, energy saving, creation, and storage can be attained.

Also, the device control unit 24 may generate the control data 27 for the devices 251 to 25m based on the human information 22a in the analysis data 22, and the control setting data 26 including the user information, attribute data, individual comfort state information, and control values corresponding to personal actions, which are stored in the storage device 4.

The device control unit 24 identifies an individual based on the human information 22a, and generates the control data 27 for practicing a comfort state set for this individual in the control setting data 26. For example, the device control unit 24 may generate the control data 27 for practicing control set for the action state in the control setting data 26 based on the human action state (an action sensitive to heat, that sensitive to the cold, during a desk work, during stand talking, during walking) included in the human information 22a.

The output control unit 5 outputs the prediction data 23 and various other data stored in the storage device 4 to the output device 15.

Furthermore, the output control unit 5 outputs the control data 27 stored in the storage device 4 to the devices 251 to 25m.

The output device 15 includes, for example, a display device, audio output device, communication device, and the like, and displays, audibly outputs, and transmits the prediction data 23 and various other data.

The devices 251 to 25m operate based on the control data 27. The devices 251 to 25m include, for example, air-conditioners, lighting devices, blind driving devices, and the like.

Figure 2:
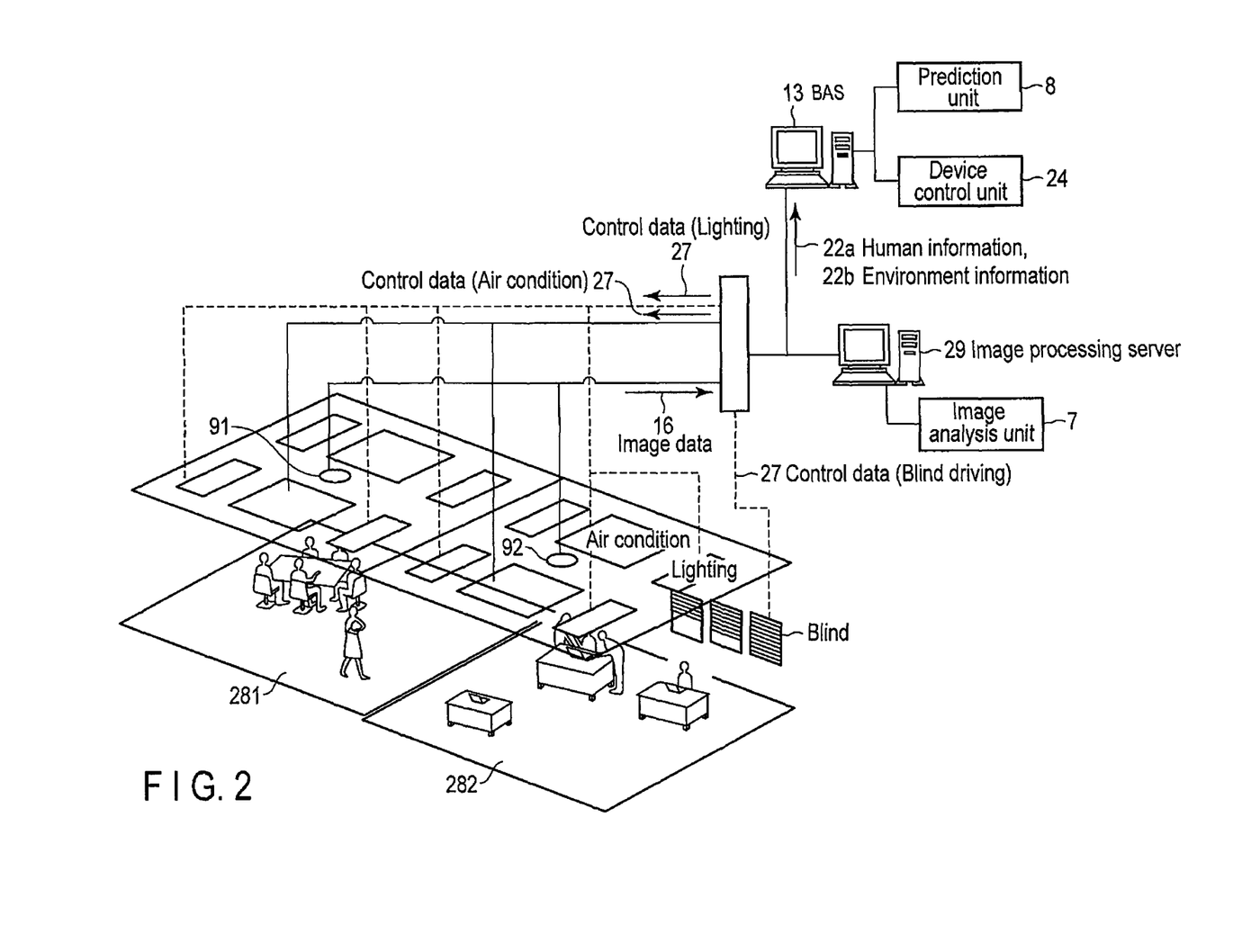
FIG. 2 is a block diagram showing an example of an energy demand prediction system including the energy demand prediction apparatus according to the first embodiment.

FIG. 2 is a block diagram showing an example of an energy demand prediction system including the energy demand prediction apparatus 1 according to this embodiment.

Image sensors 91 and 92 are installed respectively for energy demand prediction areas 281 and 282. The image sensors 91 and 92 are installed on, for example, a ceiling of an office or an outdoor, and capture images of the office. The image sensors 91 and 92 may include a visible camera, infrared camera, and the like. Image data 16 acquired by the image sensors 91 and 92 are stored in a memory area, which is prepared in advance. The image analysis unit 7 of an image processing server 29 analyzes the captured image data 16 to generate the human information 22a and environment information 22b. The image processing server 29 transmits the human information 22a and environment information 22b to the BAS 13. Note that the functions of the image analysis unit 7 may be included in the image sensors 91 and 92. In this case, the need for the image processing server 29 can be obviated.

The BAS 13 executes generating the prediction data 23 by the prediction unit 8 and device controlling by the device control unit 24 using the human information 22a and environment information 22b, in addition to building management.

For example, the prediction unit 8 executes the energy demand prediction based on the human information 22a and environment information 22b, the device data 191 to 19n from other devices 121 to 12n, and the BAS data 20 which is used by the BAS 13 and includes device use states, electric power usages, and the like.

Note that the building management such as OK/NG determination of a human action, and the energy demand prediction by the prediction unit 8 may be executed by another computer in place of the BAS 13.

The device control unit 24 specifies individuals who are staying in the energy demand prediction areas 281 and 282 based on the human information 22a. Also, the device control unit 24 specifies states (sensitive to heat, sensitive to the cold, etc.) and actions (during a desk work, during stand talking, during walking, etc.) of individuals based on the human information 22a. Furthermore, the device control unit 24 executes device control which matches attributes, states, actions, and favors of respective individuals based on attribute information and favor information of the individuals set in the control setting data 26.

The control data 27 obtained as a result of the device control is transmitted to, for example, the control target devices 251 to 25m such as air-conditioners, lighting devices, blind driving devices, and the like.

In the aforementioned energy demand prediction apparatus 1, an energy demand prediction model is generated to be able to predict an energy demand based on the human information 22a and environment information 22b in addition to information including the electric power usages, weather, temperature, schedule (business day, no-business day, or singularity), and the like.

The energy demand prediction model is built up using statistical predictions based on previous data, derivations of regression expressions for the previous data, use of physics formulas based on theories, and the like. For example, the prediction based on the energy demand prediction model is accurately done in real time. The energy demand prediction model built up with reference to the previous data executes future energy demand predictions based on actual state data of the energy demand prediction areas 281 and 282.

Note that in this embodiment, image analysis uses data acquired by the image sensor 9, infrared sensor 10, and laser sensor 11. However, all of these data need not always be used. That is, arbitrary one of the image sensor 9, infrared sensor 10, and laser sensor 11 may be installed. Alternatively, two or more sensors for at least one type of the image sensor 9, infrared sensor 10, and laser sensor 11 may be installed. Alternatively, data acquired by another sensor such as a thermo sensor (heat source sensor) may be used in image analysis. Alternatively, one or a plurality of acquired data may be selected and used in image analysis.

A practical example will be explained below. In this embodiment, the human information 22a is generated mainly using the image sensor 9, and correspondence processing to a demand response (for example, an energy consumption reduction request from a power company) and demand prediction are executed based on this human information 22a. By contrast, for example, the human information 22a may be generated using a thermo sensor, laser sensor 11, a sensor detecting a presence of person based on a technology, and the human information 22a may be used in the correspondence processing to the demand response and demand prediction.

In the aforementioned embodiment, The energy demand is predicted based on the human information 22a and environment information 22b generated based on the image data 16 in addition to the device data 191 to 19n acquired by the device sensors 121 to 12n. Thus, the prediction accuracy can be improved.

Also, using the image sensor 9 and image analysis unit 7, the number of pieces of effective information used in the energy demand prediction can be increased without installing sensors of various other types, and information which changes dynamically can be effectively used in the prediction, thus attaining a cost reduction.

In this embodiment, the device control which matches an attribute of a recognized individual and reflects a personal favor can be executed based on the device data 191 to 19n, human information 22a, environment information 22b, and control setting data 26.

In this embodiment, accurate and plenitude data, that is, the analysis data 22, device data 191 to 19n, BAS data 20, and EMS data 21 can be used as the previous data and actual state data.

In this embodiment, the accurate energy demand prediction model can be built up using information such as a temperature and humidity, which are measured using physical sensors such as the device sensors 121 to 12n, electric power information such as electric power usages of the devices 251 to 25m in the energy demand prediction area, and the human information 22a and environment information 22b acquired based on the image sensor 9.

In this embodiment, the energy demand prediction, which can maintain an optimal energy balance, can be executed at year-, month-, day-, hour-, or second-intervals or in real time.

In this embodiment, the energy demand prediction can be executed for various energy demand prediction areas 281 and 282 such as a building, floors, areas, and zones.

In this embodiment, the electric power information can be measured or acquired by the BAS 13 or electric power meter. Furthermore, in this embodiment, electric power use states of the respective devices can be estimated for the respective energy demand prediction areas 281 and 282 based on at least one of the human information 22a and environment information 22b. In response to a demand response, the device control unit 24 selects a device, which is not in use but whose power supply is ON, based on the image data 16 from the image sensor 9, and can turn off the power supply of the selected device. Therefore, in this embodiment, the device control unit 24 can flexibly executes control for the demand response.

Second Embodiment

This embodiment will explain the environment information 22b according to the first embodiment more practically.

As described above, the environment information 22b includes light information such as an illuminance, amount of solar radiation, blind opening/closing amounts, and incident amount of sunlight, layout information such as the presence/absence, locations, and number of office devices, the numbers and locations of doorways and windows, and a location of a path, the locations and numbers of heat sources and power consuming devices, weather information, and the like. The environment information 22b can be acquired by analyzing the image data 16 of the image sensor 9 installed in an office. For example, the illuminance can be calculated by setting, in advance, a luminance distribution on the image data 16 of a certain object under given conditions. Luminance levels according to illuminance levels are stored in a database based on a change in luminance on the image data 16 caused by a change in illuminance, and image sensor parameters. Learning or updating of illuminance calculations are made using illuminance and luminance levels stored in the database. As for a blind, the environment information generation unit 7b recognizes a location of the blind by means of object recognition for the image data 16 or manual inputs. Then, the environment information generation unit 7b detects a change of the blind in the image data 16, and recognizes a opening/closing amount and opening/closing angle of the blind. The state, opening/closing amount, and opening/closing angle of the blind calculated from the image data 16 are stored in a database. Learning or updating associated with recognition of the opening/closing amount and opening/closing angle of the blind is done using the blind state, opening/closing amount, and opening/closing angle of the image data 16, which are stored in the database.

The presence/absence and location of an office device, the number of office devices, and office layout information are obtained by executing recognition processing of an object such as office device and the like to the image data 16. The representative office device (desk, chair, display, PC, printer, partition, whiteboard, etc.) is recognized using a measurement of an object shape, a relationship of an object layout, or a learning technique. A direction and a size of the object in the image data 16 change depending on a positional relationship between the image sensor 9 and the object. The environment information generation unit 7b absorbs such a change and correctly recognizes the object using various learning techniques and the like. Thus, at the time of, for example, a layout change of an office or the like, the need for the user to manually input information can be obviated, and the environment information generation unit 7b can instantaneously and automatically recognize a new layout. The image sensor 9 can be installed outdoors. The environment information generation unit 7b can generate weather information, spatial information of a building to be analyzed, and layout information of a surrounding building by analyzing the image data 16 of the outdoor. Also, the environment information generation unit 7b can generate information such as a longitude and latitude of a measurement place, and a direction of a building to be measured based on a positional relationship with the sun or stars.

Various kinds of information included in the environment information 22b may be able to be acquired from various dedicated sensors. However, by acquiring various kinds of information by analyzing the image data 16 obtained by the image sensor 9, since the need for installing individual dedicated sensors can be obviated, a cost reduction can be achieved. Of the environment information 22b, the layout information, weather information, and the like can be acquired when they are manually input by a user. However, using the image sensor 9, these pieces of information can be acquired in real time, thus obviating the need of user's manual inputs.

The environment information generation unit 7b can calculate and estimate, as the environment information 22b, a measurement value at a certain point, a measurement value within a designated range, a value of a whole room, a value of a whole floor, and a value of a whole building.

Figure 3:
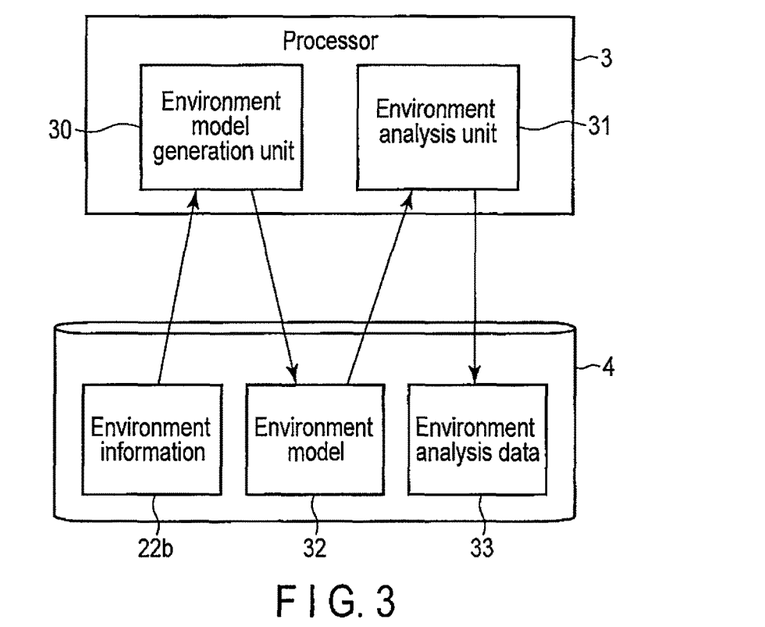
FIG. 3 is a block diagram showing an example of an environment model generation unit and environment analysis unit according to a second embodiment.

FIG. 3 is a block diagram showing an example of an environment model generation unit and environment analysis unit according to this embodiment. Note that FIG. 3 mainly shows components which are not shown in FIG. 1 above.

The processor 3 executes the program 6, which is not shown in FIG. 3, thereby implementing functions as an environment model generation unit 30 and environment analysis unit 31.

The environment model generation unit 30 generates an environment model 32 of an energy demand prediction area using a model automatic generation technique (for example, a model automatic generation tool) based on the environment information 22b stored in the storage device 4. For example, the environment model 32 represents a feature and characteristic of the environment. Then, the environment model generation unit 30 stores the environment model 32 in the storage device 4.

The environment analysis unit 31 executes restoration of a three-dimensional space, estimation of a temperature and humidity, estimation of heat and wind, air-conditioning simulation, and the like based on the environment model 32, and generates environment analysis data 33. Then, the environment analysis unit 31 stores the environment analysis data 33 in the storage device 4.

The output control unit 5 outputs the environment analysis data 33 to the output device 15, which is not shown in FIG. 3.

In this embodiment, the environment model 32 is built up based on the environment information 22b, and restoration of the three-dimensional space, estimation of the temperature and humidity, estimation of heat and wind, air-conditioning simulation, and the like can be executed based on the environment model 32.

The environment information 22b may be used in combination with various kinds of information (for example, indoor and outdoor temperature and humidity values, a wind speed, a $CO_2$ concentration, weather, etc.) acquired by normal sensors, and information from the BAS 13.

Furthermore, the environment information 22b can improve the measurement accuracy using the human information 22a.

The environment analysis unit 31 of this embodiment may predict a condition of another floor from a condition of one floor based on the environment information 22b.

Third Embodiment

This embodiment will explain the human information 22a according to the first embodiment more practically.

As described above, the human information 22a includes information such as the presence/absence of the person or the number of persons, the distribution, the amount of activity, the amount of clothing, the attribute (name, gender, body type, body height, age, etc.), the position (standing position, seated position, etc.), and the activity state (office work, transfer, conversation, etc.) of the person in the energy demand prediction area. The human information 22a is acquired by analyzing the image data 16 of the image sensor 9 installed in an office. The human information generation unit 7a extracts a motion of a person by analyzing a change in luminance in time and a spatial direction of the image data 16. The human information generation unit 7a identifies a person and another object, and identifies its action and behavior. A target to be identified by the human information generation unit 7a is stored in a database, and a learning technique is applied to the identification by the human information generation unit 7a.

The human information generation unit 7a can calculate and estimate, as the human information 22a, a measurement value at a certain point, a measurement value within a designated range, a value of a whole room, a value of a whole floor, and a value of a whole building.

Figure 4:
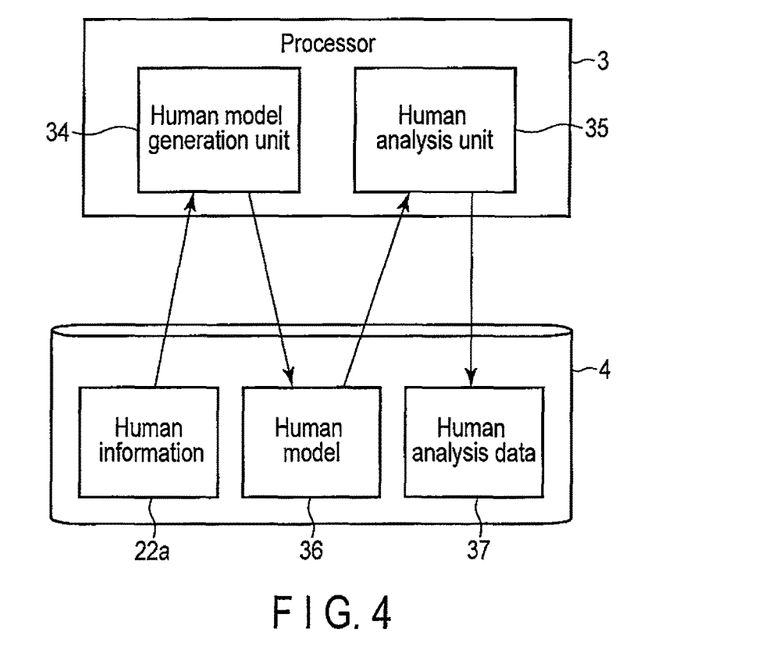
FIG. 4 is a block diagram showing an example of a human model generation unit and human analysis unit according to a third embodiment.

FIG. 4 is a block diagram showing an example of a human model generation unit and human analysis unit according to this embodiment. Note that FIG. 4 mainly shows components, which are not shown in FIG. 1 above.

The processor 3 executes the program 6, which is not shown in FIG. 4, thereby implementing functions as a human model generation unit 34 and human analysis unit 35.

The human model generation unit 34 generates a human model 36 in an energy demand prediction area using a model automatic generation technique based on the human information 22a stored in the storage device 4. For example, the human model 36 represents a feature and characteristic of a person. Then, the human model generation unit 34 stores the human model 36 in the storage device 4.

The human analysis unit 35 executes an action prediction of a person and air-conditioning and lighting simulations according to the action of the person based on the human model 36, and generates human analysis data 37. Then, the human analysis unit 35 stores the human analysis data 37 in the storage device 4.

The output control unit 5 outputs the human analysis data 37 to the output device 15.

In this embodiment, the human model 36 in the energy demand prediction area is built up based on the human information 22a, and the action prediction, the air-conditioning and lighting simulations according to the action of the person, and the like can be executed based on the human model 36.

The human information 22a may be used in combination with information from a building central monitoring system, entry/leave management system, and security system.

Furthermore, the human information 22a can improve the measurement accuracy using the environment information 22b.

The human analysis unit 35 according to this embodiment may predict a condition of another floor from a condition of one floor in association with the human information 22a.

Fourth Embodiment

This embodiment will explain modifications of the first to third embodiments described above.

Figure 5:
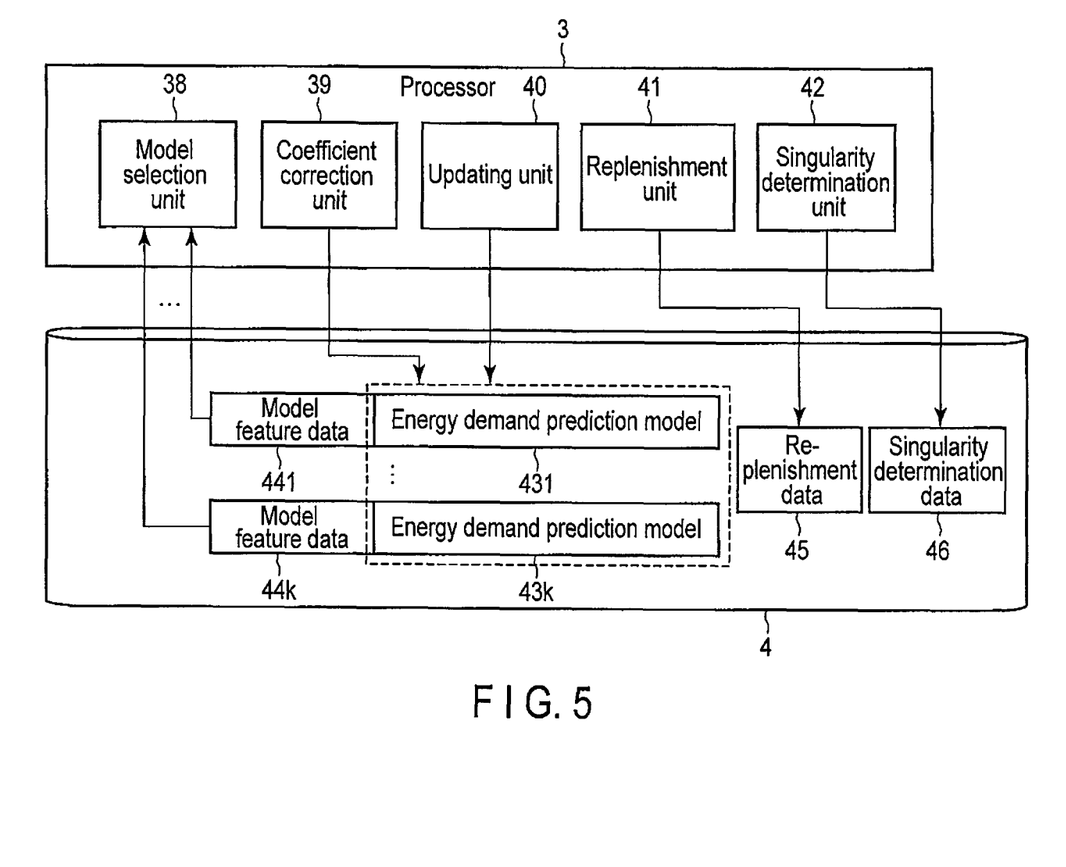
FIG. 5 is a block diagram showing an example of an arrangement of an energy demand prediction apparatus according to a fourth embodiment.

FIG. 5 is a block diagram showing an example of an arrangement of an energy demand prediction apparatus according to this embodiment. FIG. 5 mainly shows only components which are not shown in FIG. 1 above.

The processor 3 executes the program 6, which is not shown in FIG. 5, thereby functioning as a model selection unit 38, coefficient correction unit 39, updating unit 40, data replenishment unit 41, and singularity determination unit 42. These units will be described below.

[Model Selection Unit 38]

The storage device 4 stores a plurality of energy demand prediction models 431 to 43k, and model feature data 441 to 44k which respectively indicate features of the plurality of energy demand prediction models 431 to 43k.

The plurality of energy demand prediction models 431 to 43k and the corresponding model feature data 441 to 44k are associated with each other.

The model feature data 441 to 44k are used as criteria required to select an appropriate model from the plurality of energy demand prediction models 431 to 43k.

The model selection unit 38 selects, based on data such as current (latest) human information 22a, current environment information 22b, and current device data 191 to 19n, model feature data which matches a content indicated by the current data from the model feature data 441 to 44k. Then, the model selection unit 38 selects an energy demand prediction model corresponding to the selected model feature data.

The prediction unit 8 executes an energy demand prediction based on the energy demand prediction model selected by the model selection unit 38.

In this embodiment, a plurality of energy demand prediction models are prepared in accordance with previous data tendencies.

In this embodiment, an energy demand prediction model optimal to the current energy demand prediction area can be selected from the plurality of energy demand prediction models 431 to 43k. For example, even when previous data, which were referred to upon building up a certain energy demand prediction model, include the same weather or season as the current weather or season, when the number of persons in a room upon building up the model is different from the current number of persons in the room, the model selection unit 38 gives priority to a head-count condition over the previous weather or season, and selects an energy demand prediction model which matches the head-count condition.

Thus, the prediction accuracy can be improved.

[Coefficient Correction Unit 39]

The coefficient correction unit 39 automatically corrects coefficients of the energy demand prediction models 431 to 43k based on data such as the acquired human information 22a, environment information 22b, and device data 191 to 19n. Thus, the prediction accuracy can be improved.

More specifically, the coefficient correction unit 39 corrects the coefficients of the energy demand prediction models 431 to 43k based on the current information or information including time-serial changes such as an increase or decrease in the number of persons in a building or floor, a weather or cloud condition, and incident sunlight. For example, when the number of persons on a floor is increased immediately, the coefficient correction unit 39 adjusts a coefficient corresponding to the number of persons, so as to build up an energy demand prediction model which matches the actual state, thereby minimizing a difference between an actual energy demand and a predicted value.

[Updating Unit 40]

The updating unit 40 updates (sequentially updates) the energy demand prediction models 431 to 43k based on the current data such as the human information 22a, environment information 22b, and device data 191 to 19n every time a predetermined period elapses. For example, the updating unit 40 sequentially updates the energy demand prediction models 431 to 43k using data acquired a day ahead, data acquired an hour earlier, and data acquired a minute earlier. Updating of the energy demand prediction models 431 to 43k can use various model automatic generation techniques.

In this embodiment, the energy demand prediction models 431 to 43k are sequentially updated using not only the human information 22a and environment information 22b acquired by the image sensor but also the device data 191 to 19n such as electric power information, weather information, or the like, thus improving the prediction accuracy.

[Data Replenishment Unit 41]

The data replenishment unit 41 calculates replenishment data 45 effective for the energy demand prediction based on the acquired data such as the human information 22a, environment information 22b, and device data 191 to 19n. Then, the data replenishment unit 41 stores the replenishment data 45 in the storage unit 4.

For example, various components such as the model selection unit 38, coefficient correction unit 39, and updating unit 40 execute their processes using the replenishment data 45 calculated by the data replenishment unit 41.

For example, when the electric power usages of the devices 251 to 25m cannot be directly acquired, the data replenishment unit 41 estimates the electric power usages of the devices 251 to 25m based on electric power information, the human information 22a, the environment information 22b, and the like, which can be acquired.

For example, the data replenishment unit 41 determines that a personal computer, which is placed in front of a working person, is ON, and estimates an electric power usage based on his or her attending time. As for a printer and a copying machine, their electric power usages are estimated in the same manner as that personal computer.

For example, the data replenishment unit 41 estimates an electric power user amount of each room based on an electric power user amount of a whole floor and attending conditions of respective rooms.

For example, the data replenishment unit 41 estimates or predicts use conditions of office devices based on a layout of each room and a distribution of the number of persons, and can reflect them to the energy demand prediction.

For example, the data replenishment unit 41 estimates or calculates a measurement item for an area without any sensors based on data of an area installed with a sensor.

For example, the number of persons of an area without any image sensor can be calculated by estimating flows of persons based on human information acquired from surrounding image sensors.

Thus, the prediction accuracy can be improved, and cost can be reduced compared to a case in which all values are measured using sensors.

[Singularity Determination Unit 42]

The singularity determination unit 42 executes, for example, comparison processing with a threshold based on the acquired data such as the human information 22a, environment information 22b, and device data 191 to 19n, thus determining or predicting a singularity. Then, the singularity determination unit 42 stores singularity determination data 46 indicating a determination result in the storage device 4.

For example, various components such as the model selection unit 38, coefficient correction unit 39, updating unit 40, and data replenishment unit 41 execute their processes using the singularity determination data 46.

A day (singularity) such as an anniversary of foundation of a company, which is different from a normal day, has an energy demand tendency different from the normal day. Hence, energy demands have to be carefully predicted.

For example, different energy demand prediction models are prepared for a business day and a singularity, and it is important to recognize the singularity. As a setting of the singularity, a schedule may be manually input. However, the same energy demand prediction as that of the singularity is often exhibited on an unexpected day. For this reason, the singularity determination unit 42 determines or predicts a singularity based on the image data 16 acquired by the image sensor 9. Thus, an unexpected energy demand variation can be coped with in advance.

The singularity determination unit 42 determines or predicts a singularity using an increase or decrease in the number of persons, a flow of persons, the number of transferring persons, a head-count distribution on respective floors, their time-serial changes, and the like included in the human information 22a mainly obtained from the image data 16. Thus, energy demand tendency of a whole building, whole floor, and whole room can be predicted, thus improving the energy demand prediction accuracy of the whole building.

For example, for a singularity, an energy demand prediction model can be switched.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An energy demand prediction apparatus comprising:
an image analyzer that generates, based on image data acquired by an image sensor, analysis data including human information and environment information of a prediction target area, the human information including an identification of an individual;
a predictor that generates prediction data by executing an energy demand prediction based on the human information and environment information and an energy demand prediction model generated using previous data corresponding to the analysis data, the energy demand prediction model matching the human information when the previous data is different from the analysis data;
a device controller that generates, based on the prediction data, the identification of the individual and control setting data including a control value set for the individual, control data which matches the individual; and
an output controller that outputs the control data to a corresponding device.

2. The energy demand prediction apparatus of claim 1, wherein the previous data includes data acquired by a device sensor, and
the predictor executes the energy demand prediction based on the analysis data, the data acquired by the device sensor, and the energy demand prediction model.

3. The energy demand prediction apparatus of claim 1, wherein
the environment information includes at least one of light information, device layout information, or weather information, and
the energy demand prediction apparatus further comprises an environment model generator that generates an environment model, the environment model representing a feature of an environment of the prediction target area based on the environment information.

4. The energy demand prediction apparatus of claim 1, wherein
the human information includes at least one of head-count information, distribution information, activity amount information, clothing amount information, attribute information, or action information of persons, and
the energy demand prediction apparatus further comprises a human model generator that generates, based on the human information, a human model, the human model representing a feature of a person who is staying in the prediction target area.

5. The energy demand prediction apparatus of claim 1, further comprising:
a storage device that stores a plurality of energy demand prediction models and model feature data respectively indicating features of the plurality of energy demand prediction models in association with each other; and
a model selector that selects, based on the analysis data, the energy demand prediction model associated with the model feature data which matches the analysis data, wherein the predictor executes the energy demand prediction based on the analysis data and the selected energy demand prediction model.

6. The energy demand prediction apparatus of claim 1, further comprising:
a coefficient corrector that corrects a coefficient of the energy demand prediction model based on the analysis data.

7. The energy demand prediction apparatus of claim 1, further comprising:
a model updater that sequentially updates the energy demand prediction model based on the analysis data every time a predetermined period elapses.

8. The energy demand prediction apparatus of claim 1, further comprising:
a data estimator that estimates a value used in the energy demand prediction based on the analysis data.

9. The energy demand prediction apparatus of claim 1, further comprising:
a singularity determinator configured to determine a singularity based on the analysis data, and to generate singularity determination data indicating a determination result.

10. An energy demand prediction method by a computer, comprising:
generating, based on image data acquired by an image sensor, analysis data including human information and environment information of a prediction target area, the human information including an identification of an individual;
storing the analysis data in a storage device;
generating prediction data by executing an energy demand prediction based on the human information and environment information stored in the storage device and an energy demand prediction model generated using previous data corresponding to the analysis data, and storing the prediction data in the storage device, the energy demand prediction model matching the human information when the previous data is different from the analysis data;
generating, based on the prediction data, the identification of the individual an control setting data including a control value set for the individual, control data which matches the individual; and
outputting the control data to a corresponding device.

* * * * *